(12) United States Patent
Savarese et al.

(10) Patent No.: US 7,922,262 B2
(45) Date of Patent: Apr. 12, 2011

(54) BEARING WHEEL HUB UNIT

(75) Inventors: Claudio Savarese, Airasca (IT); Angelo Vignotto, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 505 days.

(21) Appl. No.: 11/403,455

(22) Filed: Apr. 13, 2006

(65) Prior Publication Data
US 2006/0244303 A1    Nov. 2, 2006

(30) Foreign Application Priority Data

Apr. 29, 2005  (EP) .................................... 05009417

(51) Int. Cl.
*B60B 27/00*  (2006.01)
(52) U.S. Cl. ................. 301/105.1; 301/111.04; 384/544
(58) Field of Classification Search ............... 301/105.1, 301/111.04, 111.01, 35.627, 35.629, 108.1; 384/544
See application file for complete search history.

(56) References Cited

U.S. PATENT DOCUMENTS

| 4,167,294 | A | * | 9/1979 | Okazaki et al. | ............ 301/108.1 |
| 4,421,197 | A | | 12/1983 | Chandioux | |
| 5,333,939 | A | | 8/1994 | Krude et al. | |
| 5,486,053 | A | * | 1/1996 | Beagley et al. | ............ 301/105.1 |
| 5,806,936 | A | * | 9/1998 | Guimbretiere | ............ 301/105.1 |
| 7,153,029 | B2 | * | 12/2006 | Monetti et al. | ................ 384/544 |
| 7,232,374 | B2 | * | 6/2007 | Tajima et al. | ................ 384/544 |

FOREIGN PATENT DOCUMENTS

GB        2 109 874 A    6/1983

* cited by examiner

*Primary Examiner* — Jason R Bellinger
(74) *Attorney, Agent, or Firm* — Merchant & Gould P.C.

(57) ABSTRACT

Bearing wheel hub unit (1) is provided with a mounting flange (3) which is integral with an inner race (21) of the bearing (2) in order to mount a wheel, and with a centering collar (4) which extends from a frontal surface (31) of the flange (3) to permit the centering of the wheel in relation to the unit (1). The centering collar (4) produced, preferably of alloy, in such a way as to be independent of the mounting flange (3), and is assembled with the flange (3) by fixing onto the frontal surface (31).

2 Claims, 3 Drawing Sheets

BEARING WHEEL HUB UNIT

BACKGROUND OF THE INVENTION

The present invention relates to a bearing wheel hub unit.

In general, bearing wheel hub units of a well known kind comprise a mounting flange which is integral with an inner race of the bearing in order to mount a wheel, and a centering collar, which is defined by an annular body which is produced in a single piece with the flange by means of removing shavings, and which extends frontally and transverse to the flange itself in order to permit the centering of the wheel in relation to the unit itself.

Bearing wheel hub units of the kind which have just been described above present some disadvantages due to the fact that, once the centering collar has been produced by means of turning, it is then necessary to subject the same centering collar to anti-corrosion treatment, which can only be carried out after the centering collar has been carefully cleaned and, in the case in which such treatment is carried out at a certain temperature, it must also be carried out in such a way as to ensure that no damage is suffered by the other components of the unit.

SUMMARY OF THE INVENTION

The aim of the present invention is to produce a bearing wheel hub unit, which will permit the resolution of the above-mentioned disadvantages in a simple and cost-effective manner.

According to the present invention, a bearing wheel hub unit will be produced, presenting a rotation axis and comprising a mounting flange which is integral with an inner race of the bearing for the mounting of a wheel, and a centering collar which extends from a frontal surface of the flange itself in order to permit the centering of the wheel in relation to the axis; the unit being characterised by the fact that the centering collar is produced, preferably made of alloy, in such a way as to be independent of the mounting flange, and is assembled to the flange by means of being fixed onto the frontal surface.

BRIEF DESCRIPTION OF THE DRAWINGS

The present invention will now be described with reference to the attached drawings, which illustrate a non-limiting for of embodiment of the present invention, and in which.

DETAILED DESCRIPTION OF THE PREFERRED EMBODIMENT(S)

Figure 1:
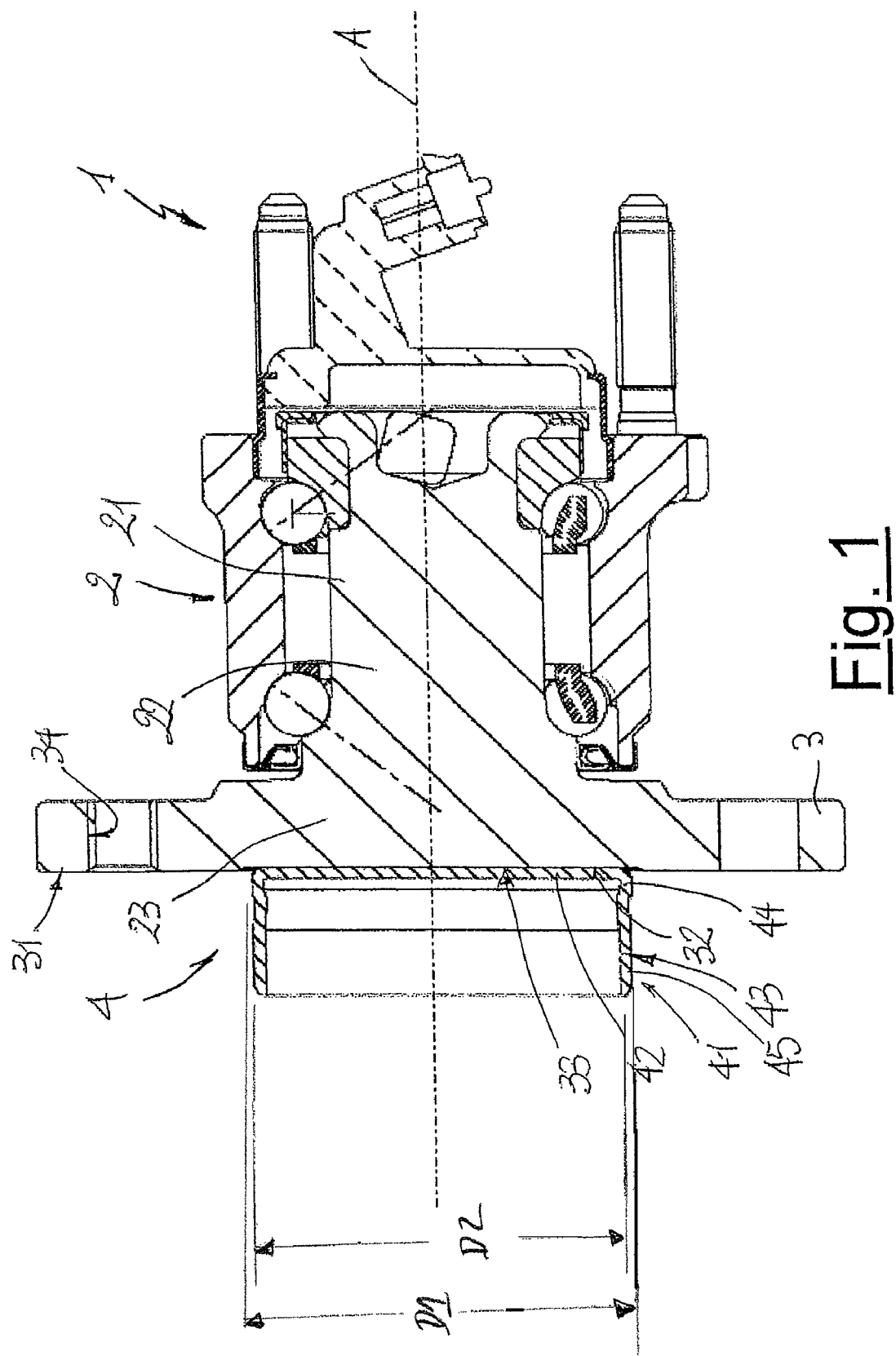
FIG. 1 is a section view of a first preferred form of embodiment of a bearing wheel hub unit according to the present invention.

With reference to FIG. 1, the number 1 refers to a bearing wheel hub unit in its entirety.

The unit 1 presents a rotation axis A, and comprises a bearing 2 which is provided with an inner race 21 which can rotate around the axis A, and a mounting flange 3, which is integral with the race 21, and which is arranged transverse to the axis A, and which presents a number of passing attaching holes 34 which are uniformly distributed around the axis A in order to fix a wheel (which is noted but not illustrated).

The unit 1 also comprises a centering collar 4, which is fixed to the flange 3 at the end of the production cycle of the unit 1, and which extends from a frontal surface 31 of the flange 3 itself in order to permit the centering of the above-mentioned wheel in relation to the unit 1, or rather in relation to the axis A.

The inner race 21 presents a central body 22 which is co-axial to the axis A, and the flange 3 is integral with an axial end 23 of the body 22, and extends radially towards the outside of the end 23 and transverse to the axis A. Both the body 22 and the flange 3 are laterally delimited by the surface 31, which is arranged transverse to the axis A, and which presents, substantially in correspondence to the body 22 itself, a notch 32 with a flat base 33 which is centred on the axis A.

The collar 4 is produced in such a way as to be totally independent of the unit 1 and preferably, but not necessarily, of alloy, and is defined by a cup-shaped body 41 which comprises a base wall 42, and a lateral wall 43 which is externally cylindrical and which is integral with the base wall 42 itself.

The base wall 42 is arranged inside the notch 32 in such a way as to be in direct contact with the base 33, and is fixed to the base 33 itself by means, for example, of welding, or gluing, while the lateral wall 43 comprises two external cylindrical sections 44 and 45, which present respective external diameters D1 and D2 which have tapering dimensions starting from the frontal surface 31, and of which the section 44 is directly joined to the base wall 42.

Figure 2:
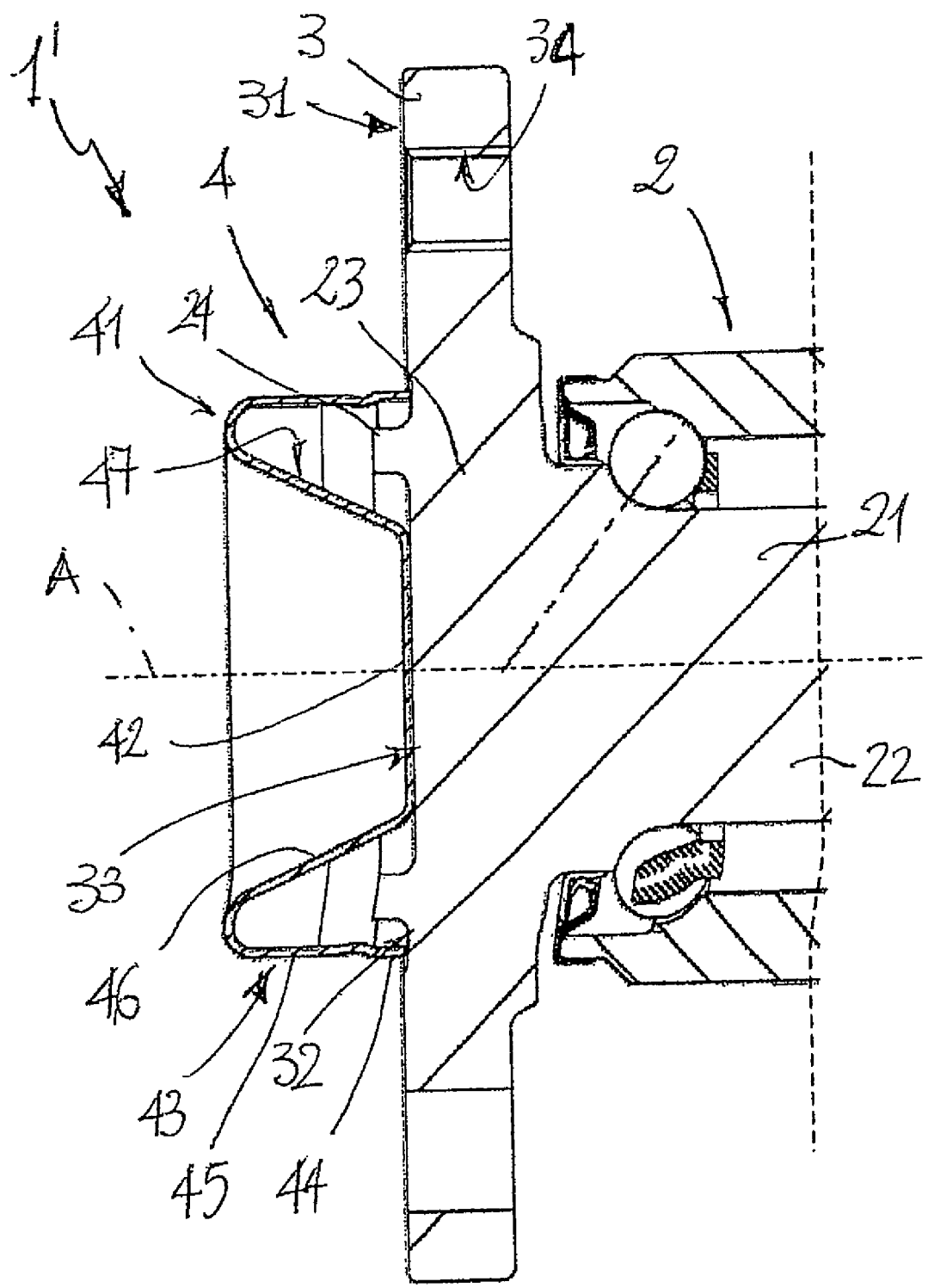
FIG. 2 is a section view, with some parts removed for reasons of clarity, of a second preferred form of embodiment of the bearing wheel hub unit which is shown in FIG. 1.

The form of embodiment which is shown in FIG. 2 relates to a unit 1' which is similar to the unit 1, from which the unit 1' differs due to the fact that the lateral wall 43 also comprises, in addition to the two external cylindrical sections 44 and 45, an intermediate connecting section 46 between the two sections 44 and 45 and the base wall 42.

In particular, the section 46 presents a tapering shape which narrows towards the surface 31, and directly connects the position 45 to the wall 42 in such a way as to permit, in the first place, the section 44 to be arranged in direct contact with and transverse to the surface 31, and, in the second place, the sections 44 and 45, to form with the section 46 a doughnut/ring-shaped chamber 47 which is delimited by the sections 44 and 45 and 46 themselves, and which is axially delimited by the surface 31 and the section 46.

Furthermore, in the form of embodiment which is shown in FIG. 2, the central body 22 comprises an annular projection 24, which extends from the frontal surface 31 transverse to the frontal surface 31 itself, and it is both included inside the notch 32, and enclosed inside the chamber 47 rendering obvious the possibility of being able to use the collar 4 of the unit 1' on bearing wheel hub units which are also provided with the already noted collar which is made in a single piece with the flange 3.

Figure 3:
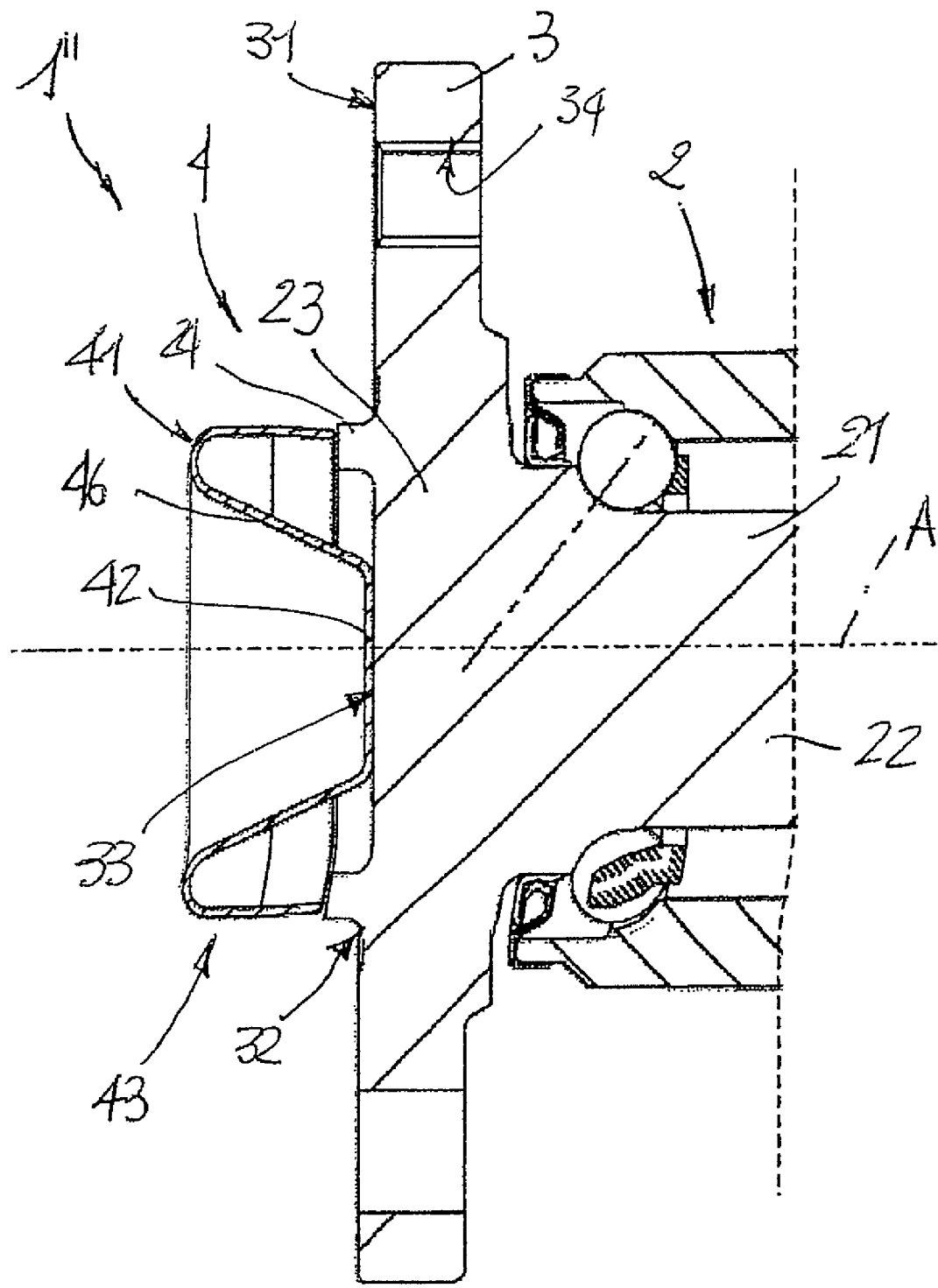
FIG. 3 is a section view, with some parts removed for reasons of clarity, of a third preferred form of embodiment of the bearing wheel hub unit which is shown in FIG. 1.

The form of embodiment which is shown in FIG. 3 relates to a unit 1" which is similar to the unit 1', from which the unit 1" differs due to the fact that the lateral wall 43 comprises a single external section 44 which has a substantially cylindrical shape, which is connected to the base wall 42 by means of the intermediate connecting section 46, and is arranged in direct contact with the projection 24.

In practice, any form of embodiment whatsoever of the above-described bearing wheel hub unit may be produced without any particular kind of working in the area of the surface 31 apart from the production of the notch 32, and may be coupled to a centering collar 4 as has been described above in its various different forms of embodiment at the end of its production cycle which not only makes it possible to reduce the production cycle time, but also to produce a general kind of bearing wheel hub unit which does not depend on the kind of wheel to be mounted.

The collar 4, which at this point, its production being totally independent of that of the unit 1 or the unit 1', may be made of materials which are alternative to the above-mentioned alloy, and may also be pre-treated with an anti-corrosion treatment before being arranged inside the notch 32 centred both in relation to the axis A and in relation to the holes 34.

The advantages of being able to fix the collar 4 to the bearing wheel hub unit at the end of the production cycle reside above all in the simplification of the so-called forging, or rather the basic element from which the production of the bearing wheel hub unit itself starts, in eliminating costly working operations and anti-corrosion treatment, which, as has already been noted, are carried out on the finished bearing wheel hub unit and which, as has already been discussed, require a high level of cleaning as well as protection against polluting agents arising from other areas with the risk of damaging the bearing 2 in the case that certain temperatures are reached.

Furthermore, in the case of the bearings 2 which differ only due to the diameters D1 and D2, the adoption of the collar 4 permits the standardization of the race 21 with considerable advantages in terms of reducing production and planning costs.

It is intended that the present invention should not be limited to the forms of embodiment which are herein described and illustrated, which are to be considered as examples of forms of embodiment of the bearing wheel hub unit, and which may be instead subject to further modifications in terms of the shape and disposition of its parts, as well as to details pertaining to construction and assembly.

The invention claimed is:

1. Bearing wheel hub unit having a rotation axis and comprising:
    a mounting flange integral with an inner race of a bearing for mounting a wheel, and
    a centering collar extending axially from a frontal surface of the flange to permit centering of the wheel in relation to the axis; the centering collar comprising: a base wall in contact with a base of the mounting flange; a lateral wall having a first substantially cylindrical external section in contact with and transverse to the frontal surface, a second substantially cylindrical external section axially aligned with the first external section and having a diameter less than a diameter of the first external section, and an intermediate connecting section between the two external cylindrical sections and the base wall;
    wherein the centering collar is operable to be independent of the mounting flange, and is fixed onto said frontal surface of the flange, wherein said centering collar is directly fixed to a central body of the inner race; the flange being integral with the central body; and wherein said frontal surface includes a notch, and an annular projection extending axially from the central body and is enclosed at least in a radial direction between the two external cylindrical sections and the intermediate connecting section.

2. Unit according to claim 1, wherein the centering collar is defined by a cup-shaped body comprising a base wall and a lateral wall which is externally cylindrical and which is integral with the base wall; the base wall being fixed to the frontal surface.

\* \* \* \* \*